United States Patent [19]

Cybulski

[11] Patent Number: 4,564,156
[45] Date of Patent: Jan. 14, 1986

[54] VIDEOCASSETTE WEAR BUTTON

[75] Inventor: Claude E. Cybulski, Oakdale, Minn.

[73] Assignee: Minnesota Mining and Manufacturing Company, St. Paul, Minn.

[21] Appl. No.: 621,113

[22] Filed: Jun. 15, 1984

[51] Int. Cl.$^4$ .......................... G03B 1/04; G11B 15/32
[52] U.S. Cl. .................... 242/197; 242/71.8; 242/199
[58] Field of Search ............. 242/71.8, 71.9, 197–200; 360/132, 137

[56] References Cited

U.S. PATENT DOCUMENTS

| | | | |
|---|---|---|---|
| 2,476,928 | 7/1949 | Thomas | 242/71.8 |
| 4,226,381 | 10/1980 | Katata | 242/71.8 |
| 4,289,282 | 9/1981 | Kohno | 242/71.8 |
| 4,371,123 | 2/1983 | Watanabe | 242/71.8 |
| 4,403,749 | 9/1983 | Nakagawa | 242/71.8 |
| 4,452,404 | 6/1984 | Gelardi et al. | 242/71.8 |
| 4,473,194 | 9/1984 | Kashimura | 242/71.8 |
| 4,473,198 | 9/1984 | Pertsch et al. | 242/71.8 |
| 4,520,969 | 6/1985 | Wolfing et al. | 242/71.8 |

FOREIGN PATENT DOCUMENTS

| | | |
|---|---|---|
| 0072517A3 | 2/1983 | European Pat. Off. . |
| 3222632 | 1/1983 | Fed. Rep. of Germany . |
| 54-37123 | 3/1979 | Japan . |
| 54-70123 | 5/1979 | Japan . |
| 55-158080 | 11/1980 | Japan . |

Primary Examiner—Leonard D. Christian
Attorney, Agent, or Firm—Donald M. Sell; James A. Smith; David W. Anderson

[57] ABSTRACT

Videocassette tape spool including a wear button piece which is formed as a separate, small piece and which projects beyond one of the flanges of the tape spool. The wear button piece is molded of a highly abrasion-resistant polymer and is mounted to the hub of the spool by means of a cylindrical stud projecting from the hub and a hexagonal blind bore formed within the wear button piece which accepts the stud in an interference fit.

5 Claims, 6 Drawing Figures

VIDEOCASSETTE WEAR BUTTON

BACKGROUND OF THE INVENTION

1. Field of the Invention

This invention concerns videocassette tape spools, and particularly those which include abrasion-resistant wear buttons that ride against leaf springs mounted on the upper, inner faces of the cassettes.

2. Description of the Prior Art

Each of the Betamax, VHS and compact VHS-C videocassettes has a pair of tape spools loosely positioned side-by-side within the cassette housing. When the cassette is inserted into a videotape recorder, a pair of spindles fit into interior teeth of the hubs of the spools and press the spools against a leaf spring which is mounted to the inner, upper face of the cassette. The spring has two arms, each of which contacts an abrasion-resistant wear button on each of the tape spools.

The tape spools of a typical videocassette has two parts, each a single piece of molded plastic. The first piece is opaque and includes a hub and one flange. The second piece is a transparent plastic disk which provides the other flange and has a central opening through which the wear button protrudes.

The typical prior practice is typified by U.S. Pat. No. 4,289,282 and Japanese utility model No. JA54-37123, wherein the wear button is molded as an integral part of the hub and projects through a hole provided in the transparent flange. Since the wear button must be of an abrasion-resistant plastic such as acetal resin, this integral molding technique requires that the entire hub and its attached flange be likewise molded of this material. Since acetal resin is relatively expensive, this design is economically disadvantageous.

In an effort to reduce costs, the wear button was subsequently molded as a separate piece which could be assembled to the integral hub and flange and captured by the clear closing flange when the spool was assembled. Such a construction is illustrated by Japanese utility models Nos. JA54-70123 and JA55-158080 and German Pat. No. DE 3222632 A1. European Pat. No. 0 072 517 A3 discloses a steel ball which rests in a socket formed in the hub to provide an abrasion-resistant wear button.

These designs are an improvement over the integrally molded concept in that the wear button may consist of a relatively expensive material while the hub and flange to which the wear button is attached may be molded from a cheaper material such as acrylonitrile-butadiene-styrene (ABS) or high-impact polystyrene (HIPS). However, it has been found that the loose capture of the wear button between the hub and flange or the positioning of a spherical wear button within a socket allows the wear button to rotate relative to the hub or the socket. This relative rotation of the abrasion-resistant wear button relative to the softer material comprising the mounting portion of the hub causes the softer material of the hub to melt or abrade, and the wear button may actually melt or abrade its way completely through the material from which the hub is molded.

It is necessary, therefore, that the abrasion-resistant wear button be prevented from rotating relative to the hub upon which the wear button is mounted and it is highly desirable that the mounting arrangement between the wear button and the hub be common for each of the Betamax, VHS and VHS-C videocassette spools so that a single, common wear button may be used with each of these slightly different constructions.

SUMMARY OF THE INVENTION

The tape spool of the invention, like typical videocassette spools, comprises a flanged hub having a cylindrical tape-winding surface and a wear button projecting beyond the flanged hub at the axis of the spool. This novel tape spool differs from typical videocassette spools in that the hub of the spool includes a stud projecting from the hub at and coaxial with the axis of the spool and in that the wear button is a portion of a separate, small piece mounted on the stud and including a blind bore adapted to accept the stud in an interference fit and an outer surface along the axis of the spool which is rounded and projects beyond one of the spool flanges to serve as the wear button.

The wear button is preferably formed of an acetal resin and preferably is hat-shaped to include a generally conical protuberance and an enlarged brim adjacent the wider end of the proturberance. The generally conical portion has a rounded end which serves as the wear button and an internal blind bore adapted to accept the stud projecting from the hub in an interference fit. The enlarged brim is provided merely for ease of grasping during assembly. The interference fit between the stud projecting from the hub and the bore of the wear button prevents relative rotation between the wear button and the hub, and thus prevents the wear button from melting or abrading the material comprising the hub.

The blind bore formed within the wear button is preferably hexagonal in cross-section, but alternatively may be square in section. As a second alternative, the blind bore may be circular in cross-section with inwardly-projecting ridges.

BRIEF DESCRIPTION OF THE DRAWING

The present invention will be more thoroughly described with reference to the accompanying drawing wherein like numbers refer to like parts in the several views, and wherein.

DESCRIPTION OF THE PREFERRED EMBODIMENT

Figure 1:
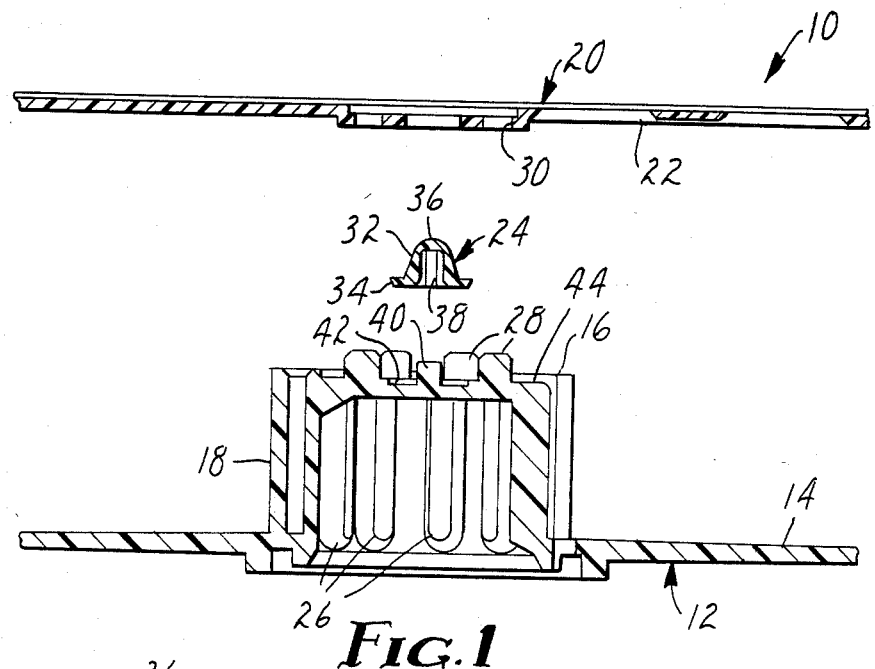
FIG. 1 is an exploded, elevational, cross-sectional view through the diameters of a videocassette spool and a separate small piece including the wear button of the present invention.

The tape spool of FIG. 1, generally indicated as 10, consists of three pieces of molded plastic: (1) an opaque first piece 12 providing one flange 14 and a hub 16 providing a cylindrical tape-winding surface 18, (2) a transparent disk 20 providing a second flange 22 which is adapted to close the hub 16 and complete the spool 10, and (3) a wear button piece 24.

The opaque first piece 12 providing one flange 14 and the hub 16 is preferably molded of a relatively inexpensive polymer such as acrylonitrile-butadiene-styrene (ABS) copolymer or high-impact polystyrene (HIPS), includes internal teeth 26 adapted to engage a drive spindle of a videotape recorder (not shown) and a number of axially-projecting, deformable fasteners 28 which are adapted to project through holes 30 formed in the transparent flange 22. After assembly of the flange 22 to the hub 16, the fasteners 28 are deformed by heat to capture the flange 22 and provide an integral spool 10.

Figure 2:
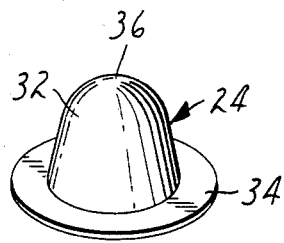
FIG. 2 is a perspective view of the separate, small piece of FIG. 1 comprising the wear button.
Figure 3:
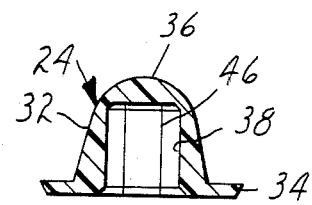
FIG. 3 is an enlarged, cross-sectional view of the separate piece including the wear button of FIG. 1.
Figure 4:
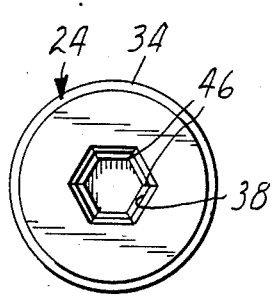
FIG. 4 is a bottom plan view of the small piece comprising the wear button of FIG. 1.

The flange 22 is preferably transparent to permit the observation of the amount of tape remaining on the spool 10 and is preferably molded of styrene-acrylonitrile copolymer. The wear button piece 24 is interposed between the transparent flange 22 and the hub 16 prior to assembly and is preferably molded of a highly abrasion-resistant polymer material such as acetal resin. The wear button piece 24 is molded as a separate, small piece because acetal resin is expensive as compared to the ABS or HIPS used to mold the flange 14 and hub 16 unit. The wear button piece 24 is hat-shaped in longitudinal cross-section and is comprised of a conical projection 32 which is circular in transverse cross-section and an enlarged brim 34 which is circular and is attached to the conical projection 32 at the widest portion of the projection 32. As best seen in FIG. 2, the conical projection 32 of the wear button piece 24 terminates in a rounded narrow end 36, the surface of which forms the wear button.

Molded through the brim 34 and into the conical projection 32 of the wear button piece 24 is a blind bore 38 which is preferably hexagonal in transverse cross-section and which is adapted to receive a stud 40 axially extending from the hub 16 in an interference fit. The brim 34 of the wear button piece 24 fits within a recess 42 formed adjacent the stud 40 so that the transparent flange 22 may contact the upper surface 44 of the hub 16.

The interference fit between the hexagonal bore 38 of the wear button piece 24 and the stud 40 projecting from the hub 16 is necessary to prevent relative rotation between the wear button piece 24 and the hub 16 which would result in abrasion and possibly melting of the hub 16 by the wear resistant acetal resin comprising the wear button piece 24. However, an adequate interference fit is difficult to achieve in polymeric materials because of unpredictable shrinking and surface defects, and because the diameter of the stud 40 is extremely small, approximatey 1.85 mm (0.073 inches). It has been found that a hexagonal bore 38 in the wear button 24 alleviates these interference fit problems in plastic parts, presumably because the cylindrical stud 40 only contacts six discrete faces of the bore 38 rather than the entire inner surface of the bore which would be the case if the bore 38 were circular. This limited contact between the stud 40 and the bore 38 allows the material comprising the wear button piece 24 to cold flow in the area of contact with the stud 40 and thereby accommodate a relatively large tolerance range in the diameter of the stud 40. The corners 46 of the hexagonal shape allow air to escape from the interior of the bore 38 as the stud 40 is inserted and thus facilitates assembly and prevents the build-up of pressure within the wear button piece 24 which might tend to force the piece 24 off the stud 40.

The interference fit between the bore 38 and the stud 40 is sufficient to prevent relative rotation between the wear button piece 24 and the hub 16, and it is not necessary that the brim portion 34 of the wear button piece 24 be trapped between the recess 42 and the transparent flange 22 in order to prevent this relative rotation. In fact, the depth of the recess 42 is different depending on whether the spool 10 is to be used in a Betamax, VHS or VHS-C videocassette. In all cases, however, a clearance is provided between the bottom surface of the recess 42 and the flange 22, which clearance is larger than the thickness of the brim 34. The brim 34, therefore, does not aid in the prevention of relative rotation between the stud 40 and the wear button piece 24, but is provided merely to facilitate handling of the wear button piece 24 and orientation of the piece 24 for assembly.

Since it is not necessary to trap the brim 34 of the wear button piece 24, interchangeability is realized because a single wear button piece 24 may be used with all of the various videocassettes by altering the depth of the recess 42.

As indicated above, the preferred transverse cross-sectional shape of the blind bore 38 is hexagonal since it has been found that this shape produces sufficient contact between the bore 38 and the stud 40 to prevent rotation while sufficiently limiting the area of contact between the bore 38 and the stud 40 so that assembly of the wear button piece 24 to the stud 40 is not unduly difficult.

Figure 5:
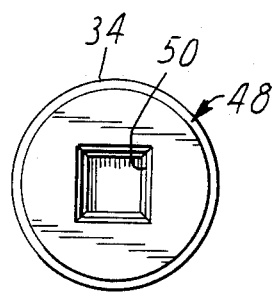
FIG. 5 is a bottom plan view of an alternate embodiment of a separate small piece comprising a wear button.
Figure 6:
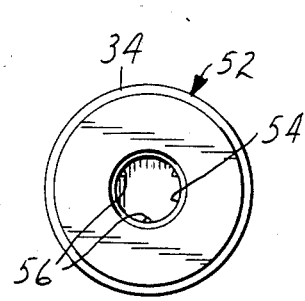
FIG. 6 is a bottom plan view of a second alternate embodiment of a separate, small piece comprising a wear button.

FIGS. 5 and 6 illustrate alternate embodiments of wear button pieces which may be utilized, although less advantageously than the wear button piece 24 described above with respect to FIGS. 1–4. FIG. 5 illustrates a wear button piece 48 which is identical in all respects to the wear button piece 24 of FIGS. 1–4 with the exception that the wear button piece 48 is provided with a blind bore 50 which is square in transverse cross-section rather than hexagonal. The square shape of the blind bore 50 reduces the contact area between the bore 50 and the stud 40 and thus may be useful to accommodate greater tolerance differences in the diameter of the stud than may be accommodated by the hexagonal shape of the bore 38. The square shape of the blind bore 50 of FIG. 5 is not preferred, however, because the limited area of contact between the bore 50 and the stud 40 is more apt to permit detrimental relative rotation between the wear button piece 48 and the hub 16.

FIG. 6 illustrates a wear button piece 52 which is identical in all respects to the wear button pieces 48 of FIG. 5 and 24 of FIGS. 1–4 with the exception that the wear button piece 52 is provided with a circular blind bore 54 having three inwardly-projecting, triangular ridges 56. The ridges 56 cause depressions in the stud 40 which interlock with the ridges 56 to prevent relative rotation of the wear button piece 52 and the stud 40 and the ridges 56 deform somewhat to accommodate the interference fit with the stud 40 and tolerance variations in this interference fit. The design of FIG. 6, however, is not preferred because a mold necessary to produce the ridged configuration is difficult and expensive to produce and maintain.

Thus although various shapes of the bore within the wear button piece 24 are possible, a hexagonal transverse cross-sectional shape provides an optimal balance between gripping area and accommodation of tolerance variations of the stud 40.

Although the present invention has been described with respect to three distinct embodiments, further modifications will be apparent to those skilled in the art.

The appended claims are intended to include all such modifications falling within the spirit and scope thereof.

I claim:

1. In a tape spool for a tape cassette, which spool comprises two flanges connected by a hub having a cylindrical tape-winding surface and a wear button projecting beyond the flanged hub at the axis of the spool, the improvement comprising:

a stud including an outer surface and projecting from said hub at and coaxial with said axis; and a separate piece mounted on said stud and including a blind bore adapted to accept said stud in an interference fit which generates sufficient friction between said stud surface and said separate piece to prevent relative movement between said stud and said separate piece during normal usage of said tape spool in a said tape cassette, said separate piece further including a terminal outer surface along said axis which is rounded and projects beyond one of said flanges to serve as said wear button.

2. An improved tape spool according to claim 1 wherein said separate piece contacts less than the entire outer surface of said stud to provide for the egress of air from said blind bore as said separate piece is mounted on said stud.

3. An improved tape spool according to claim 2 wherein said blind bore is hexagonal in transverse cross-section.

4. An improved tape spool according to claim 3 wherein said stud is cylindrical.

5. An improved tape spool according to claim 4 wherein said separate piece is acetal resin.

* * * * *